United States Patent [19]

Jerred

[11] Patent Number: 5,080,551

[45] Date of Patent: * Jan. 14, 1992

[54] APPARATUS FOR PALLETIZING LAYERS OF CIRCULAR CONTAINERS ARRANGED IN A HONEYCOMB PATTERN

[75] Inventor: Harold L. Jerred, Pardeeville, Wis.

[73] Assignee: Busse Bros. Inc., Randolph, Wis.

[ * ] Notice: The portion of the term of this patent subsequent to May 30, 2006 has been disclaimed.

[21] Appl. No.: 284,338

[22] Filed: Dec. 14, 1988

Related U.S. Application Data

[63] Continuation of Ser. No. 74,675, Jul. 17, 1987, Pat. No. 4,834,605.

[51] Int. Cl.$^5$ ............................................. B65G 57/22
[52] U.S. Cl. ................................ 414/791.7; 198/462; 198/458
[58] Field of Search ............... 198/434, 458, 461, 462; 414/791.7, 789.5, 790, 790.3

[56] References Cited

U.S. PATENT DOCUMENTS

| | | | |
|---|---|---|---|
| 2,380,910 | 7/1945 | Newton | 198/458 |
| 2,535,880 | 12/1950 | Tomkins | 414/790.3 X |
| 2,571,790 | 10/1951 | Tomkins | 198/434 X |
| 2,949,179 | 8/1960 | Busse | 198/434 X |
| 3,442,401 | 5/1969 | Wolfe et al. | 414/791.7 X |
| 3,643,822 | 2/1972 | Birchall | 414/790 X |
| 3,645,410 | 2/1972 | Powell | 414/791.7 |
| 3,680,678 | 8/1972 | Ganz | 198/434 X |
| 3,897,877 | 8/1975 | Vandermeer et al. | 414/789.5 X |
| 3,937,336 | 2/1976 | Carlson | 414/791.7 X |
| 4,129,207 | 12/1978 | Cupp | 198/458 X |
| 4,834,605 | 5/1989 | Jerred | 198/434 X |

Primary Examiner—D. Glenn Dayoan
Attorney, Agent, or Firm—Michael, Best & Friedrich

[57] ABSTRACT

An apparatus for arranging nested, parallel rows of generally circular containers on a conveyor, the rows extending in the direction of conveyor movement, with the containers of alternate rows being offset relative to the containers of the remaining rows, the apparatus comprising partitions for forming a first row of containers, and for directing containers transversely to the direction of conveyor movement so that containers nest against previously formed rows to form successive rows.

14 Claims, 3 Drawing Sheets

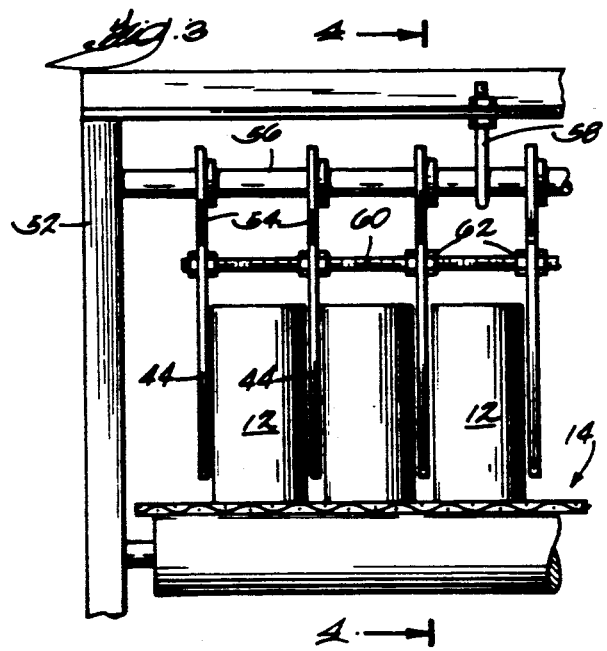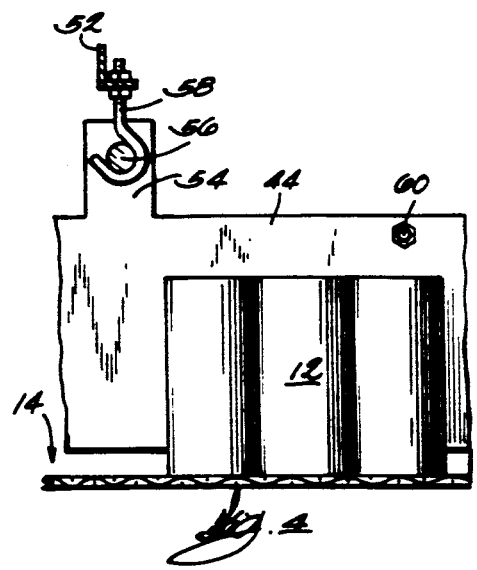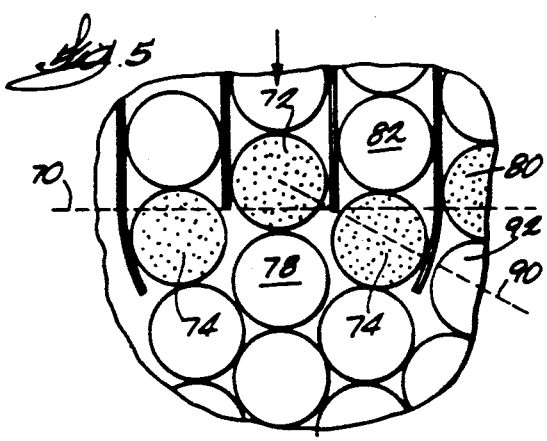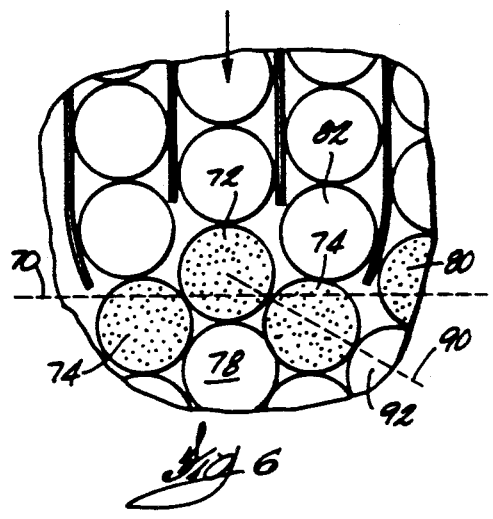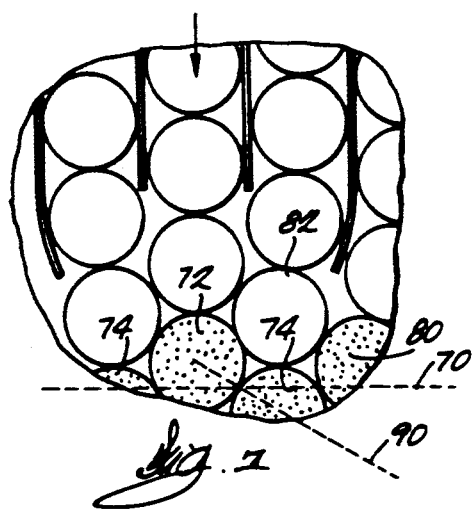

APPARATUS FOR PALLETIZING LAYERS OF CIRCULAR CONTAINERS ARRANGED IN A HONEYCOMB PATTERN

This is a continuation of application Ser. No. 074,675, filed July 17, 1987, now U.S. Pat. No. 4,834,605.

BACKGROUND OF THE INVENTION

The invention relates to apparatus for palletizing containers, and more particularly to apparatus for palletizing circular containers arranged in a honeycomb pattern. The invention also relates to apparatus for arranging circular containers in a honeycomb pattern.

Empty containers, and typically 12 ounce beverage cans, are generally transported to canners or bottlers on pallets. Individual layers of cans on pallets are commonly arranged in a honeycomb pattern, i.e., in nested, parallel rows with the containers of alternate rows being offset one container radius relative to the containers of the remaining rows. Cans are usually patterned on the palletizer conveyor. Various methods and apparatus are known for arranging cans in a honeycomb pattern on a conveyor. See, for example, U.S. Pat. No. 2,949,179, to Busse issued Aug. 16, 1960. Another known method for arranging cans in a honeycomb pattern is to provide fences or guide rails on opposite sides of the conveyor and then allow cans to "pile up" on the conveyor and form the honeycomb pattern by themselves. This method is known as "self-patterning."

Unfortunately, none of the known methods and apparatus provide perfect honeycomb patterns. In other words, none of the known methods and apparatus provide consistently "voidless" patterns, i.e., patterns having therein the maximum possible number of cans. This wastes available storage space and is also irritating to purchasers of cans.

Also, known methods and apparatus require the presence of an operator for each conveyor belt in order to fill voids. However, to reduce costs, it is desirable to use a single operator for two conveyors, have the conveyors running at relatively high speeds, e.g., 2,000 cans per minute, and have voidless patterns. This is not possible with known methods and apparatus.

SUMMARY OF THE INVENTION

The invention provides an apparatus for arranging generally circular containers into a honeycomb pattern. The apparatus comprises a conveyor having a generally horizontal upper surface and a downstream end. Typical use has a palletizer at the downstream end to place the patterned cans onto pallets for storage or shipment.

In the preferred embodiment, the patterning apparatus includes a plurality of spaced partitions extending generally in the direction of conveyor movement and dividing the upper surface of the conveyor into a plurality of lanes each having a width slightly greater than the diameter of a container. Preferably, the partitions are strips of sheet metal standing on edge and having a height greater than the height of a container. The sheet metal strips can be supported above the conveyor upper surface by any suitable means. For example, the strips can be suspended from a frame extending over the conveyor upper surface.

The partitions include a pair of parallel center partitions defining a center lane having an outlet, and, on both sides of the center partitions, a plurality of spaced outer partitions having respective upstream portions extending parallel to the center partitions and respective arcuate downstream portions concentric about a point located adjacent the outlet of the center lane. The downstream ends of the outer partitions form a V which opens downstream of the conveyor and which is bisected by the longitudinal axis of the conveyor. In other words, the downstream ends of the outer partitions are aligned to form an acute angle relative to the longitudinal axis of the conveyor. Preferably, this acute angle is approximately equal to 52.5°, so that the V forms an angle of approximately 105°. The outer partitions define outer lanes which have respective outlets that face inwardly toward the longitudinal axis of the conveyor.

When containers are carried along the upper surface of the conveyor and between the partitions, or along the lanes formed by the partitions, the center partitions form a center row of containers, and the outer partitions direct containers inwardly toward the center row so that containers nest against previously formed rows to form successive rows on both sides of the center row.

The apparatus actually "places" a container in each position of the honeycomb pattern, so that a voidless pattern is obtained. The apparatus has a relatively simple construction and is relatively inexpensive to manufacture. Also, the apparatus can be easily added to existing "self-patterning" palletizing assemblies.

It should be understood that the pattern need not have a center row or can have an even number of rows and therefore two "center" rows.

Other features and advantages of the invention will become apparent to those skilled in the art upon review of the following detailed description, claims and drawings.

DESCRIPTION OF THE DRAWINGS

FIG. 3 is a view taken along line 3—3 in FIG. 2.

FIG. 4 is a view taken along line 4—4 in FIG. 3.

FIGS. 5-7 are sequential views showing the formation of the honeycomb pattern.

Figure 1:
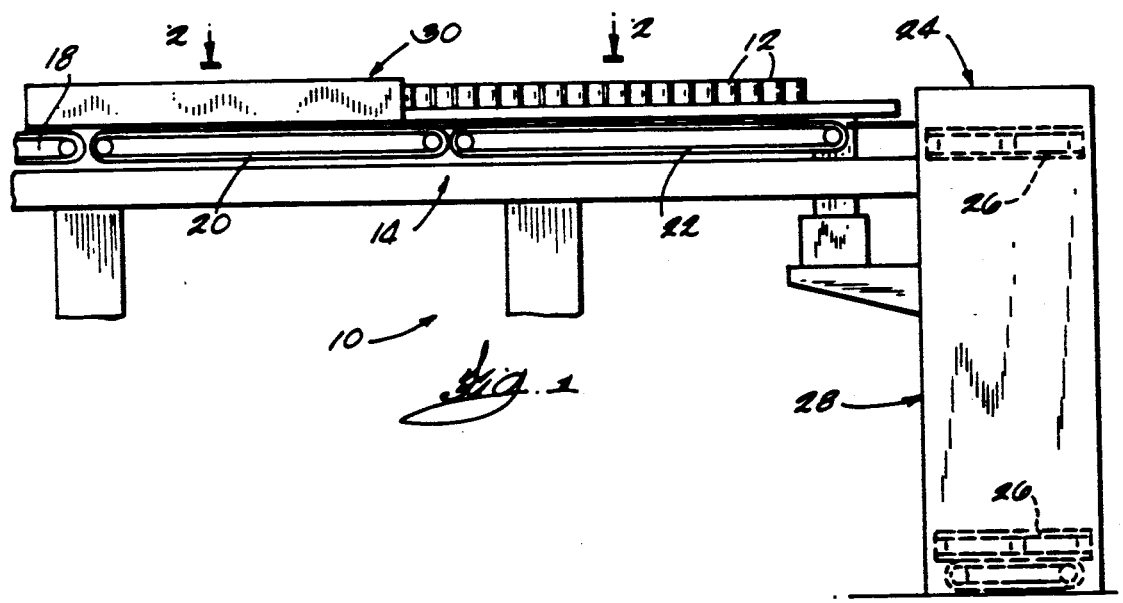
FIG. 1 is a partially schematic, side elevational view of a palletizing assembly embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A palletizing assembly 10 embodying the invention is illustrated in the drawings. The assembly 10 palletizes layers of generally circular objects, preferably 12-ounce beverage cans 12. However, it should be understood that the invention has other uses besides palletizing and is applicable to other objects and to other sizes and types of containers. For example, the patterning apparatus of the invention could be used to pattern glass jars, plastic containers, or cans of other sizes.

Figure 2:
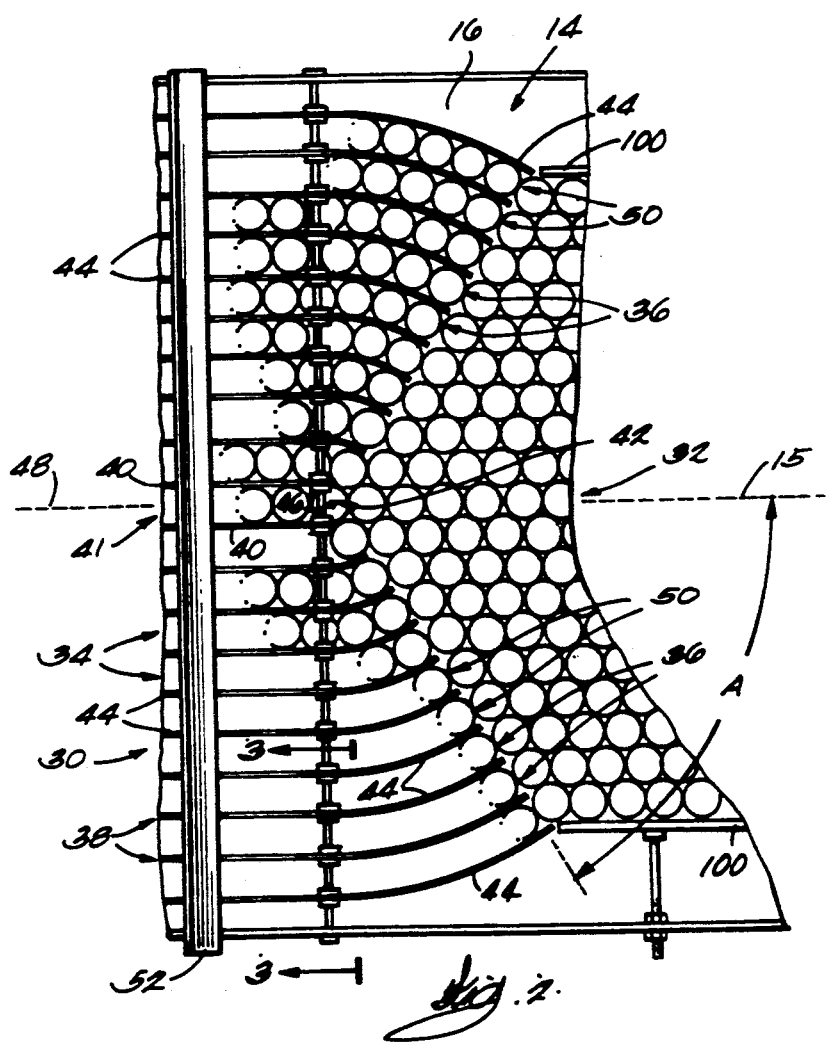
FIG. 2 is a partial top plan view of the palletizing assembly.

As shown in FIGS. 1 and 2, the assembly 10 comprises a conventional palletizer 24 (shown schematically in FIGS. 1 and 2). The palletizer 24 includes a conveyor 14 including a longitudinal axis 15 and a generally horizontal upper surface 16 moving from left to right. In the preferred embodiment, the conveyor 14 actually includes three endless conveyor belts 18, 20 and 22 arranged end-to-end. The upper surfaces of adjacent conveyor belts are connected by conventional transfer plates (not shown). The left or upstream conveyor belt 18 moves at a speed of approximately 45 feet per minute, the middle conveyor belt 20 moves at a speed of approximately 35 feet per minute, and the right or downstream conveyor belt 22 moves at a speed of approximately 100–110 feet per minute. The reasons for the different conveyor speeds are explained hereinafter. It should be understood that other conveyor arrangements, not necessarily including moving belts, can be employed. The palletizer 24 also includes means for moving a layer of patterned cans onto a pallet 26 or onto a separator sheet placed on top of a previously deposited layer of cans 12, and an elevator or hoist 28 for lowering the pallet 26 so that the top of the pallet 26 or the top of the previously deposited layer of cans is even with the upper surface of the conveyor 14. This arrangement is known in the art and will not be described in greater detail. It should be understood that other palletizers can be employed.

The assembly 10 further comprises an apparatus 30 for arranging containers or cans on the conveyor 14 into a honeycomb pattern, i.e., a pattern of nested, parallel rows extending parallel to the longitudinal axis 15 of the conveyor 14, with the containers of alternate rows being offset one container radius relative to the containers of the remaining rows. As shown in FIG. 2, the pattern preferably includes 19 longitudinal rows. As also shown in FIG. 2, each longitudinal row has a bottom side and a top side. Because the cans 12 are nested, the bottom side of each row is actually below the top side of the row below, and the top side of each row is actually above the bottom side of the row above. Furthermore, the pattern includes transverse rows, i.e., rows extending transversely to the longitudinal axis 15 of the conveyor and at an angle of 60° relative to the longitudinal axis 15.

The apparatus 30 comprises means for forming a first row 32 of cans 12, and means for directing cans 12 transversely to the direction of conveyor movement or to the longitudinal axis 15 so that cans nest against previously formed rows to form successive rows. In the preferred embodiment, the first row 32 is the center row, and the directing means directs cans 12 inwardly toward the center row 32 so that cans nest against previously formed rows to form successive rows on both sides of the center row 32.

Preferably, the forming means and the directing means include means defining on the conveyor 14 a plurality of lanes 34 having respective outlets 36, the outlets 36 being aligned with the rows of the pattern and arranged to form a V which opens downstream of the conveyor 14. The V is bisected by the longitudinal axis 15 of the conveyor 14, and the outlets 36 preferably face inwardly toward the longitudinal axis 15 of the conveyor 14. While various suitable lane defining means can be employed, in the illustrated construction, the lane defining means includes a plurality of partitions 38 extending generally in the direction of conveyor movement and dividing the upper surface 16 of the conveyor 14 into the lanes 34. The partitions 38 include a pair of parallel first or center partitions 40 defining a center lane 41 having an outlet 42, and, on both sides of the center partitions 40, a plurality of spaced second or outer partitions 44. The outer partitions 44 have respective upstream portions extending parallel to the center partitions 40 and respective arcuate downstream portions concentric about a point 46 located adjacent the outlet 42 of the center lane 41. More particularly, the center row 32 of cans extends along a line 48 down the middle of the center lane 41, and the point 46 is located on the line 48. Thus, the center lane 41 is aligned with the center row 32 of cans. The outer partitions 44 define additional lanes having respective outlets 50 aligned with the remaining longitudinal rows of the honeycomb pattern.

More particularly, referring to FIG. 2, the upper center partition 40 is aligned with and defines the top side of the center row 32, and the outer partition 44 above the upper center partition 40 is aligned with and defines the top side of the row above the center row 32. In a similar manner, successive outer partitions 44 above the center partitions 40 are aligned with and define the top sides of successive rows of cans 12.

Preferably, the downstream ends of the outer partitions 44 are aligned to form an acute angle "A" of less than 60° relative to the longitudinal axis 15 of the conveyor. In the preferred embodiment, the acute angle "A" is approximately equal to 52.5°, so that the V formed by the outlets 50 of the lanes or by the downstream ends of the partitions 44 forms an angle of approximately 105°.

In the preferred embodiment, each lane has a width slightly greater than the diameter of a can 12. Preferably the cans 12 have a diameter of 2 ⅝ inches and the lanes have a width of 2 ¾ inches. The partitions 40 and 44 have a thickness of ⅛ inch and are spaced 2 ⅞ inch from center to center. Preferably, the partitions 40 and 44 are strips of sheet metal standing on edge and having a height greater than the height of a can 12. The sheet metal strips can be supported above the conveyor upper surface 16 by any suitable means. In the preferred embodiment, as shown in FIGS. 3 and 4, the strips are suspended from a frame 52 extending over the conveyor upper surface 16. More particularly, the strips include upwardly extending tabs 54 having therein respective bores through which a support rod 56 extends, so that the strips are suspended from the support rod 56. The support rod 56 is in turn connected at its ends to the frame 52 and is suspended from the frame 52 intermediate its ends via hook members 58. Additionally, spacer rods 60 are provided for maintaining the spacing of the strips. As shown in FIG. 2, the spacer rods 60 extend through aligned bores in the upper ends of the strips, and the strips are secured in position on the spacer rods 60 via nuts 62 threaded onto the rods 60.

In the preferred embodiment, the partitions 40 and 44 have an overall length, from the upstream end of the partitions to the downstream end of the outermost partitions 44, of approximately 79 inches. The center partitions 40 have a length of 62.5 inches, and the outermost outer partitions 44 extend 16.5 inches downstream of the center partitions 40. The upstream ends of the partitions 40 and 44 are located approximately 2 feet onto the upstream conveyor 18, and the middle conveyor 20 extends approximately 5 feet from the downstream ends of the outermost partitions 44. Thus, cans 12 are fed into the upstream ends of the lanes by the upstream conveyor 18.

Initial operation of the assembly 10 can be started either by allowing the cans 12 to "self-pattern" themselves between the partitions 40 and 44 and the hoist 28 or by "hand-patterning" the cans 12 downstream of the partitions. In order for the cans to self-pattern, the hoist 28 is deactivated and the cans 12 are allowed to back up at the hoist 28. As the cans back up, they will self-pattern between the hoist 28 and the downstream ends of the partitions 40 and 44, although it will probably be necessary for an operator to fill some voids in the pattern. Once the cans have self-patterned back to the partitions 40 and 44 and the lanes have filled with cans, the hoist 28 can be activated. If the cans are hand-patterned, the conveyor 14 is deactivated until cans 12 are patterned several feet downstream of the partitions 40 and 44 and the lanes are filled. Thereafter, the conveyor 14 and the hoist 28 can be activated.

Additional cans are placed on the upstream conveyor 18. Cans 12 can be placed on the upstream conveyor 18 by any suitable means, many of which are known in the art. Such means do not form a part of the present invention. It is intended that cans will "pile up" somewhat at the upstream ends of the partitions 40 and 44 because they will engage the partitions 40 and 44 and will not always move immediately into a lane. For this reason, it is intended that cans 12 will slip somewhat relative to the upstream belt 18. If desired, means can be provided for spreading cans 12 on the upstream conveyor 18 upstream of the partitions so that the cans move more easily into the lanes. Such a means is disclosed in U.S. Busse Pat. No. 2,949,179, issued Aug. 16, 1960, which is incorporated by reference. Other suitable means are known in the art and can be employed.

Once in the lanes, cans 12 move from the upstream conveyor 18 to the middle conveyor 20. Cans are not intended to slip on the middle conveyor 20, which is primarily responsible for moving cans 12 through the partitions 40 and 44. Therefore, the middle conveyor 20 does not move as fast as the upstream conveyor 18. Cans are intended to move steadily through the partitions 40 and 44 and then downstream from the partitions in the honeycomb pattern.

Formation of the honeycomb pattern is illustrated in FIGS. 5-7. Looking at a line 70 fixed relative to the conveyor 14 and extending perpendicular to the longitudinal axis 15 of the conveyor 14, the can 72 in the center row 32 is the first to exit the partitions and assume its position in the honeycomb pattern. Next, as shown in FIG. 6, the cans 74 of the adjacent outer rows are directed inwardly toward the center row 32 and nested against the can 72 and the immediately downstream can 78. Finally, as shown in FIG. 7, the cans 80 of the next outer rows are directed inwardly toward the center row 32 and nested against the cans 74 and the immediately upstream cans 82. Successive outer rows are formed in the same manner.

Because the angle "A" formed by the outlets 50 and the longitudinal axis 15 of the conveyor 14 is less than 60°, the transverse rows of cans 12 are also formed from the center row outwardly. This is believed to be beneficial to the formation of the honeycomb pattern. Looking at the transverse row identified by the line 90 in FIGS. 5 and 6, the can 72 in the center row 32 is placed first. Next, the can 74 in the row to the right of the center row 32 is placed, and then the can 92 in the next row to the right is placed (both of the cans are shown in place in FIG. 6). The remaining cans in the transverse row are similarly placed from inside to outside.

In order to maintain the cans 12 in the honeycomb pattern downstream of the partitions 40 and 44, or in order to prevent lateral displacement of cans downstream of the partitions, the patterning apparatus 30 further comprises, on either side of the middle conveyor 20, fences or guide rails 100 extending in the direction of conveyor movement and downstream from the outermost partitions 44. Preferably, the inner surfaces of the fences 100 are aligned with the inner surfaces of the associated outermost partitions 44, so that both the downstream ends of the outermost partitions 44 and the fences 100 define the outsides of the outermost rows of cans 12.

From the middle conveyor 20, cans 12 move onto the downstream conveyor 22. The purpose of the downstream conveyor 22, which moves substantially faster than the middle conveyor 20, is to speed up the arrival of a group of cans 12 at the palletizer 24 so that the palletizer 24 can complete a cycle before the arrival of the next group of cans 12. The need for a faster downstream conveyor obviously depends on the cycle time of the palletizer 24, and a faster downstream conveyor 22 may not be necessary in some alternative embodiments of the invention. Similarly, a faster upstream conveyor 18 may not be necessary in some alternative embodiments of the invention.

While an entire palletizing assembly has been described as the preferred embodiment of the invention, it should be understood that the invention is also embodied in the patterning apparatus 30 alone. Palletizing assemblies on which the cans are self-patterning can be converted simply by adding the patterning apparatus 30. Also, the patterning apparatus 30 may have other applications besides palletizing.

Figure 8:
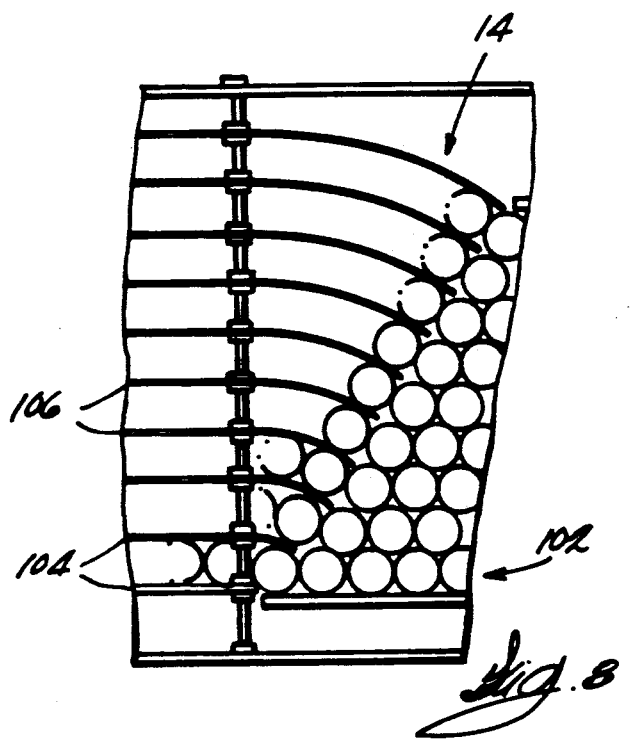
FIG. 8 is a top plan view of an alternative embodiment of the invention.
Figure 9:
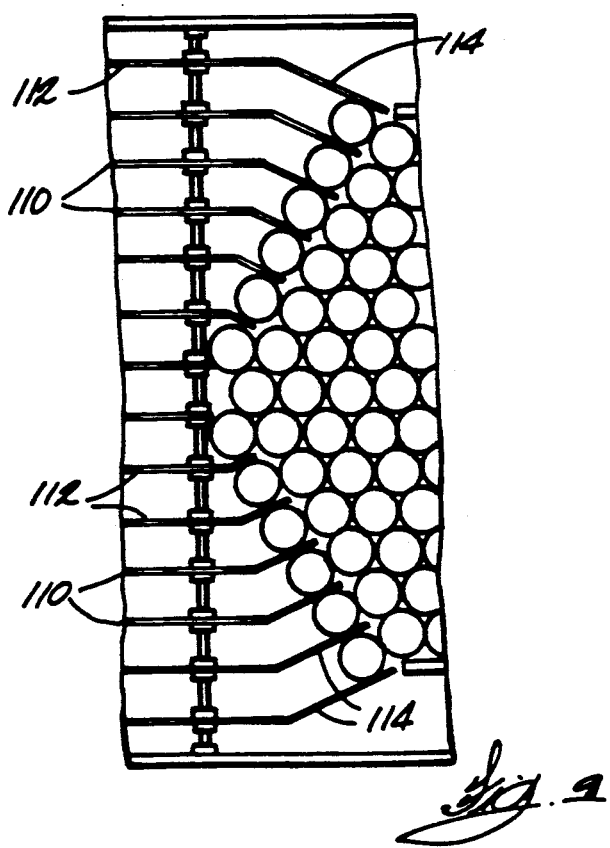
FIG. 9 is a top plan view of still another alternative embodiment of the invention.

Two alternative embodiments of the invention are illustrated in FIGS. 8 and 9. In the alternative embodiment illustrated in FIG. 8, the first row 102 is formed on the bottom of the conveyor 14, and the successive rows are formed only above the first row 102. Therefore, two parallel partitions 104 are provided on the bottom of the conveyor 14, and spaced partitions 106 with arcuate downstream portions are provided above the parallel partitions 104. The arcuate portions are concentric about a point adjacent the outlet of the lane defined by the first partitions 104. In the alternative embodiment illustrated in FIG. 9, the outlets of the lanes face inwardly and form a V, as in the preferred embodiment, but the outer partitions 110 do not include arcuate portions. Instead, the partitions 110 include straight upstream portions 112 extending parallel to the longitudinal axis 15 of the conveyor 14, and straight downstream portions 114 extending transversely to the longitudinal axis 15 of the conveyor 14.

Various of the features of the invention are set forth in the following claims.

I claim:

1. An assembly for palletizing generally circular containers, said assembly comprising
a conveyor including a downstream end, a longitudinal axis and a generally horizontal upper surface moving in the direction of the axis, said upper surface being adapted to carry a plurality of containers, said conveyor including an upstream conveyor portion having a downstream end, and a downstream conveyor portion having an upstream end located adjacent said downstream end of said upstream conveyor portion, an apparatus for arranging a pattern of nested, parallel rows of containers on said conveyor surface, said rows extending in said direction of conveyor movement, with the containers of alternate rows being offset relative to the containers of the remaining rows, said apparatus including means for forming a first row of containers, and means for directing containers transversely to the direction of conveyor movement so that containers nest against previously formed rows to form successive rows, said forming means and said directing means including means dividing said conveyor upper surface into a plurality of lanes having respective inlets and outlets, said inlets being located adjacent said downstream end of said upstream conveyor portion and said outlets being located adjacent said downstream end of said downstream conveyor portion, and means located adjacent said downstream end of said conveyor for palletizing layers of containers arranged in said pattern, said upstream conveyor portion moving faster than said downstream conveyor portion so that containers pile up at said inlets and slip on said upstream conveyor portion.

2. An assembly as set forth in claim 1 wherein said first row is a center row, and wherein said directing means directs containers inwardly toward said center row so that containers nested against previously formed rows to form successive rows on both sides of said center row.

3. An assembly as set forth in claim 1 wherein said outlets are aligned with said rows and arranged to form a V opening downstream of said conveyor, said V being bisected by the longitudinal axis of said conveyor.

4. An assembly as set forth in claim 3 wherein said outlets face inwardly toward the longitudinal axis of said conveyor.

5. An assembly as set forth in claim 3 wherein said V forms an angle of less than 120°.

6. An assembly as set forth in claim 5 wherein said V forms an angle of approximately 105°.

7. An assembly as set forth in claim 3 wherein said conveyor dividing means includes a pair of parallel first partitions defining a center lane having an outlet, and, on both sides of said first partitions, a plurality of spaced second partitions having respective upstream portions extending parallel to said first partitions and respective arcuate downstream portions concentric about a point located adjacent said outlet of said center lane.

8. An assembly as set forth in claim 1 wherein said means for forming a first row includes a pair of parallel first partitions defining on said conveyor upper surface a lane having an outlet, and wherein said directing means includes a plurality of spaced second partitions including respective upstream portions extending generally parallel to said first partitions and respective arcuate downstream portions concentric about a point adjacent said outlet of said lane, said second partitions defining on said conveyor upper surface additional lanes having respective outlets aligned with the remaining rows of said honeycomb pattern.

9. An assembly as set forth in claim 1 wherein said first row extends along a line parallel to the axis of said conveyor, and wherein said dividing means includes a plurality of spaced partitions including respective arcuate portions concentric about a point located on said line.

10. An assembly as set forth in claim 9 wherein said partitions have downstream ends aligned to form an acute angle relative to the axis of said conveyor.

11. An assembly as set forth in claim 9 wherein said means for forming said first row includes a pair of parallel first partitions defining a lane aligned with said first row and having an outlet, wherein said point is located adjacent said outlet, wherein said spaced partitions include respective upstream portions extending generally parallel to said first partitions, and wherein said arcuate portions are located downstream of said upstream portions.

12. An assembly for palletizing generally circular objects, said assembly comprising a conveyor including a downstream end, a longitudinal axis and a generally horizontal upper surface moving in the direction of the axis, said upper surface being adapted to carry a plurality of objects, said conveyor including an upstream conveyor portion having a downstream end, and a downstream conveyor portion having an upstream end located adjacent said downstream end of said upstream conveyor portion, an apparatus for arranging a pattern of nested, parallel rows of objects on said conveyor surface, said rows extending in said direction of conveyor movement, with the objects of alternate rows being offset relative to the objects of the remaining rows, said apparatus including means dividing said conveyor upper surface into a plurality of lanes having respective inlets and outlets, said inlets being located adjacent said downstream end of said upstream conveyor portion and said outlets being located adjacent said downstream end of said downstream conveyor portion, and means located adjacent said downstream end of said conveyor for palletizing layers of objects arranged in said pattern, said upstream conveyor portion always moving faster than said downstream conveyor portion during conveyor operation, so that objects pile up at said inlets and slip on said upstream conveyor portion.

13. An assembly as set forth in claim 12, wherein said downstream conveyor portion is in continuous motion during conveyor operation.

14. An assembly for palletizing generally circular objects said assembly comprising a conveyor including a downstream end, a longitudinal axis and a generally horizontal upper surface moving in the direction of the axis, said upper surface being adapted to carry a plurality of objects said conveyor including an upstream conveyor portion having a downstream end, and a downstream conveyor portion having an upstream end located adjacent said downstream end of said upstream conveyor portion, an apparatus for arranging a pattern of nested, parallel rows of objects on said conveyor surface, said rows extending in said direction of conveyor movement, with the objects of alternate rows being offset relative to the objects of the remaining rows, said apparatus including means dividing said conveyor upper surface into a plurality of lanes having respective inlets and outlets, said inlets being located adjacent said downstream end of said upstream conveyor portion and said outlets being located adjacent said downstream end of said downstream conveyor portion, and means located adjacent said downstream end of said conveyor for palletizing layers of objects arranged in said pattern, said upstream conveyor portion moving faster than said downstream conveyor portion so that objects pile up at said inlets and slip on said upstream conveyor portion.

* * * * *